Aug. 25, 1931.     H. ERNST     1,820,653
HYDRAULIC VALVE
Filed March 8, 1930
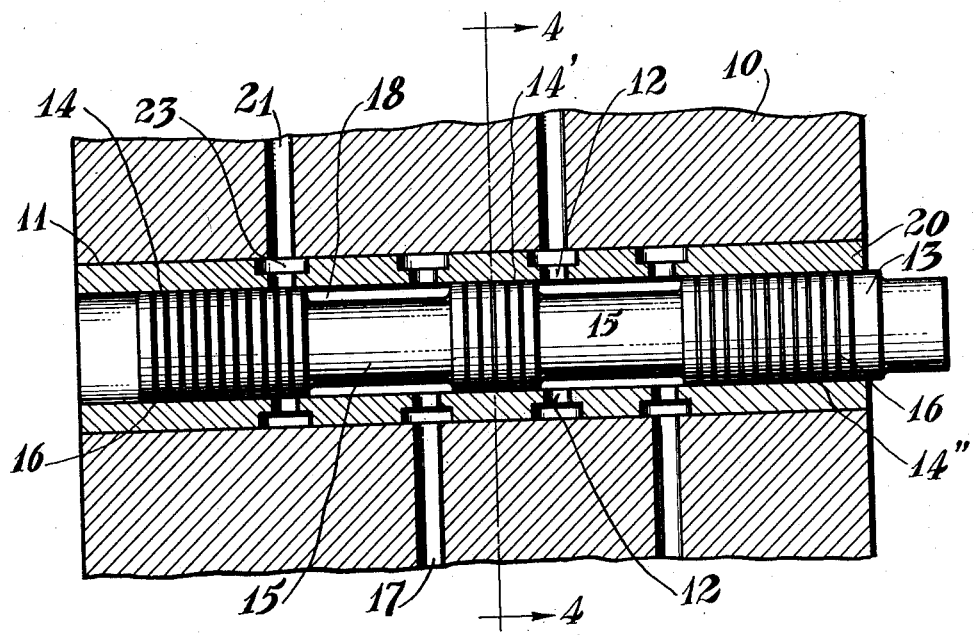
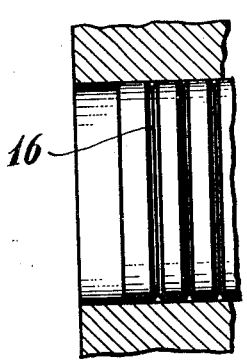
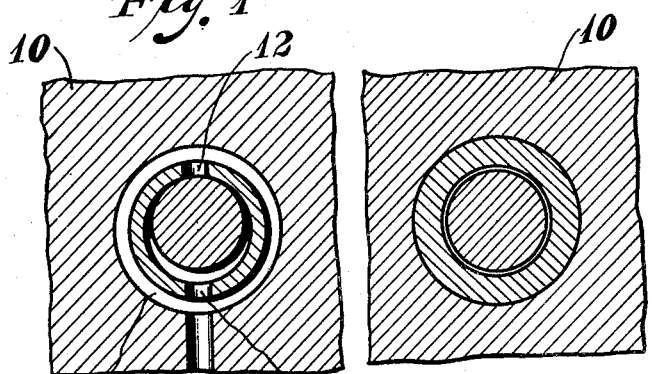
Inventor
HANS ERNST Patented Aug. 25, 1931

1,820,653

UNITED STATES PATENT OFFICE

HANS ERNST, OF CINCINNATI, OHIO, ASSIGNOR TO THE CINCINNATI MILLING MACHINE COMPANY, OF CINCINNATI, OHIO, A CORPORATION OF OHIO

HYDRAULIC VALVE

Application filed March 8, 1930. Serial No. 434,414.

This invention relates to hydraulic valves and plungers and more particularly to improvements in valves of the spool type.

One of the principal objects of the present invention is the provision of a new and improved type of valve structure adapted to control and direct the flow of a high pressure hydraulic medium in which the resulting pressure of the medium on the valve element is controlled in such a manner that no large unbalanced pressure acts laterally of the valve to restrain its movement.

Another object of this invention is the provision of means to break up stream line leakage of oil between the valve and its casing by providing equalizing chambers or grooves around the periphery of the valve.

Other objects and advantages of the present invention should be readily apparent by referring to the following specification considered in conjunction with the accompanying drawings illustrative of one empanying thereof and it is to be understood that any modifications may be made in the specific structural details hereinafter disclosed within the scope of the appended claims without departing from or exceeding the spirit of the invention.

Referring to the drawings in which like reference numerals indicate like parts Figure 1 is a sectional view of a valve presenting one embodiment of this invention.

Figure 2 is a detail of the grooves formed in the valve.

Figure 3 is a detail showing in exaggerated form the lateral displacement of a valve caused by closing a high pressure port.

Figure 4 is a section on the line 4—4 of Figure 1.

One form or embodiment of this invention is illustrated in Figure 1 in which the reference numeral 10 indicates generally a valve casing. A bushing 20 is permanently fixed in a bore 11 of the casing and has a plurality of longitudinally spaced pairs of diametrically opposing ports 12 formed therein. An annular groove or channel 23 which may be formed in the periphery of the bushing circumscribes and interconnects each pair of the ports as shown in Figure 3, which annular groove is also connected with a port formed in the valve body or casing and it is apparent that if the valve body port was a pressure one that the hydraulic medium would enter the annular groove and flow to both of the ports 12 and thus enter a valve chamber such as 18 from opposing sides thereof.

Conversely, if the valve body port was an exhaust, the hydraulic medium would leave the valve chamber from opposite sides through the ports 12 and flow by means of the annular groove to the exhaust port. The ports are arranged in this manner in order to geometrically balance the forces acting on the valve 13 slidably mounted in the bushing.

Valve 13 is composed of a plurality of spools 14, 14' and 14" connected together by reduced portions 15. The valve is adapted to slide back and forth in its bushing to control the flow of the hydraulic medium. In the operation of this type of valve it has been found that a certain amount of leakage takes place due to the differential pressures existing in various parts of the valve. In other words, leakage will flow from any point of high pressure in the valve to a contiguous point of low pressure. As an example of this assume that the port 17 is connected to a source of high pressure and fluid is flowing around the reduced portion of the valve to the port 21, the chamber 18 would then be under high pressure. If the intervening space between one of the valve spools and the bushing is at a lower pressure leakage will flow from the chamber 18 to these spaces.

These spaces may be due to imperfections in the surface of the valve spool or the bushing or to the fact that the valve may be slightly displaced laterally in its bushing as a result of a previous movement. In either case the fluid is forcibly spread between one side of the valve spool and the casing creating an unbalanced pressure on that side which will force the other side into sufficient frictional contact with the wall of the casing as to impede the movement of the valve. Again if the spool such as 14 was in position to close a high pressure port and there existed a slight space between the valve and its casing around the port orifice as a result of imperfection in the surface of the valve spool or due to the valve being slightly displaced laterally, the differential pressure between the port and the intervening space would cause the fluid to be forced into that space or in other words leakage would take place for a certain undefined area around the orifice of the port between the valve and its bushing. The leakage in this case would have the additional effect of increasing the projected area of the spool under pressure thereby causing lateral movement of the valve in its bushing which is shown in exaggerated form in Figure 3. Once this condition arises the lateral movement of the valve increases the spread of leakage which in turn increases the projected area under pressure causing further movement. It is thus seen that each of these factors aggravates the other until the valve is finally pressed into such great frictional contact with one side of the bushing that the valve will stick, making it almost impossible to move it.

In order to control this leakage and at the same time overcome this unbalancing effect of a high pressure port there is provided in the periphery of the valve spools a plurality of small annular grooves 16 shown more particularly in Figure 2 which are closely spaced together. In other words the smooth surface of the valve spools is broken up as much as possible by these small grooves, the effect of which is twofold. They tend to break up the spread of leakage while at the same time create rings of pressure around the valve which act as a centering and balancing means.

In breaking up the leakage flow the following action takes place.

Assuming that the chamber 18 is full of high pressure fluid any leakage therefrom must flow between the valve spools and the casing. This flow will spread in any given direction until it meets the first groove in the spool.

The groove would then lead the fluid about the spool before any other leakage would take place. At the completion of this fluid movement a ring of equalized fluid pressure would be formed around the spool as shown in Figure 4 which would be limited by the size of the groove. Since the pressure in this fluid ring is equal at all points it reduces the tendency of the fluid to break out at any particular point and leak to the next groove. In this manner the leakage is broken up and diminished.

The function of the grooves in aiding to overcome the unbalanced pressure on the valve from a high pressure port is as follows:

Taking the port 17 again as an example if the valve spool 14 is in a position to shut off communication therefrom the grooves which are exposed to the port pressure will lead the fluid in spaced annular paths around the valve with the result that the leakage is confined to definite annular lines irrespective of how far the leakage may flow to either side of the port. In other words the grooves translate the leakage into annular rings of pressure thus insuring that the pressure on the periphery of the valve is equal at all points. It is thus apparent that the grooves prevent the formation of uncontrolled leakage areas between one side of the valve and its bushing with their unbalancing effect on the valve and also that they aid in overcoming the unbalancing effect of a high pressure port, all of which prevents the valve from binding or sticking in its bushing and produces a freely movable valve suitable for high pressure work.

Attention is invited to the fact that valves of the above type which have no intermediate reduced portions are known as plunger valves and it is contemplated within the scope of this invention that such valves may be provided with small annular grooves for the purpose of preventing the creation of uncontrolled leakage areas and thus provide a freely movable valve.

What is claimed is:

1. In combination with a valve casing, a valve having a plurality of spools connected by reduced portions, said spools having a plurality of annular grooves longitudinally spaced therealong.

2. In a valve casing having a plurality of ports, a valve member having piston-like portions adapted to open and close said ports said portions having means thereon to cause an annular flow in a cross direction to a leakage flow to prevent the establishment of unbalanced forces on the valve.

3. In combination with a valve casing having a plurality of ports, a valve slidably mounted therein and having a plurality of piston-like portions connected by reduced portions, said reduced portions adapted to permit flow from a pressure port to an outlet port and means on the piston-like portions to retard leakage of said flow comprising a plurality of annular grooves longitudinally spaced on the periphery of the last named portions.

4. In combination with a valve body having a pair of opposing ports, a valve member for opening and closing said ports, said valve member having means thereon to cause substantial equalization of the opposing port pressures on the valve when in closed position.

5. In a device of the class described, a body member having a plurality of fluid channels therein, each channel communicating with a pair of opposed ports communicating with a bore of the body member, a valve element mounted in said bore comprising a plurality of piston-like portions connected by reduced portions, and a plurality of relatively small annular grooves closely spaced longitudinally of the first named portions whereby the leakage from a high pressure port when said port is closed or from the chamber around the reduced portions when said port is open will be prevented from localizing on one side of the valve and causing an unbalanced condition therein.

In testimony whereof I affix my signature.

HANS ERNST.